United States Patent

Playter

[11] Patent Number: 5,927,903
[45] Date of Patent: Jul. 27, 1999

[54] ENERGY DISSIPATING DOLPHIN

[75] Inventor: Doug Playter, Edmonds, Wash.

[73] Assignee: CH2M Hill, Inc., Denver, Colo.

[21] Appl. No.: 08/927,740

[22] Filed: Sep. 11, 1997

[51] Int. Cl.$^6$ .................................................... E02B 3/28
[52] U.S. Cl. ........................... 405/212; 405/211; 114/219
[58] Field of Search ................................... 405/211, 212, 405/213, 214, 215; 114/219

[56] References Cited

U.S. PATENT DOCUMENTS

| | | |
|---|---|---|
| H402 | 1/1988 | Julian et al. . |
| 1,837,988 | 12/1931 | Oberschulte . |
| 2,420,677 | 5/1947 | Peterson . |
| 3,379,020 | 4/1968 | Krug ........................................ 114/219 |
| 3,486,342 | 12/1969 | Aks . |
| 3,541,800 | 11/1970 | Walker et al. . |
| 3,834,168 | 9/1974 | Holley, Jr. . |
| 3,852,968 | 12/1974 | Holley, Jr. . |
| 3,905,199 | 9/1975 | Holley, Jr. ............................... 114/219 |
| 3,948,501 | 4/1976 | Schwemmer . |
| 4,337,009 | 6/1982 | Jackson . |
| 4,338,046 | 7/1982 | Thomerson . |
| 4,357,891 | 11/1982 | Sluys . |
| 4,411,556 | 10/1983 | Leblanc et al. . |
| 4,919,572 | 4/1990 | Bergfelder . |
| 4,932,811 | 6/1990 | Folding . |
| 5,026,226 | 6/1991 | Hollowell et al. ...................... 405/211 |
| 5,037,242 | 8/1991 | Nill ......................................... 405/211 |

*Primary Examiner*—Tamara L. Graysay
*Assistant Examiner*—Frederick L. Lagman
*Attorney, Agent, or Firm*—Swanson & Bratschun LLC

[57] ABSTRACT

A first aspect of the present invention is an energy dissipating dolphin including a plurality of elongate piles in a body of water extending substantially vertically from a bed underlying the body of water. Each pile has a proximal end driven sufficiently deep into the bed to be substantially fixed against horizontal movement and pivoting at the proximal end about a lengthwise axis upon application of a horizontal load. A plate has a hole corresponding to each distal end of a pile, the hole having a diameter sufficient to actually receive a corresponding distal end of a pile while allowing for rotation and translation of the distal end of the pile relative to the plate. A connector connects the plate and the piles. The connector permits translation and rotation of the distal ends of the piles relative to the plate upon application of a horizontal load less than a select amount and prevents translation and rotation of the distal ends of the piles relative to the plate upon application of a horizontal load greater than or equal to the select amount. The connector is preferably a steel bonnet fastened to the plate over each hole, each steel bonnet cap having an inner diameter slightly greater than an outer diameter of a corresponding pile.

13 Claims, 5 Drawing Sheets

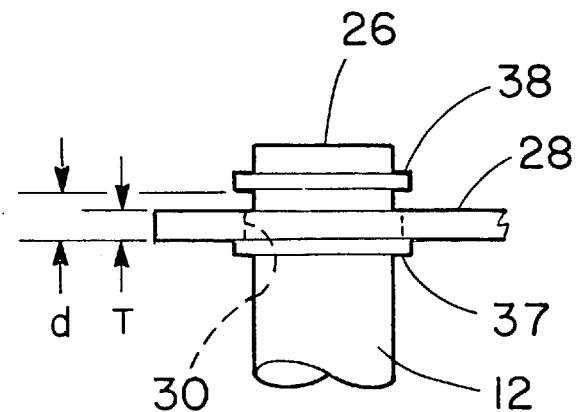
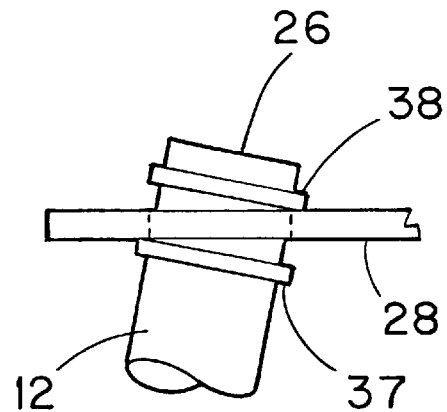
FIG. 4　　　　　　FIG. 5
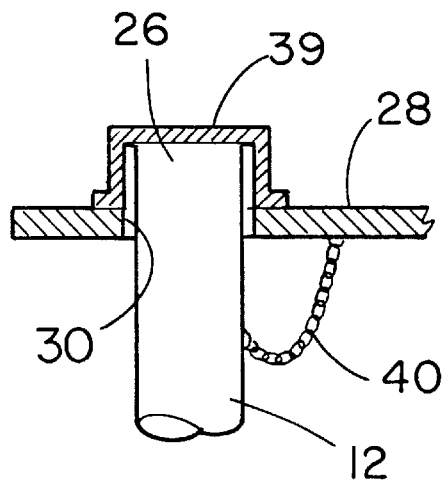
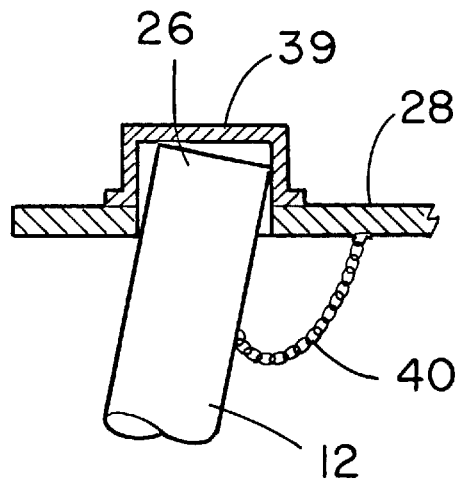
FIG. 6　　　　　　FIG. 7

ENERGY DISSIPATING DOLPHIN

TECHNICAL FIELD

The present invention is directed generally toward mooring structures for maritime vessels, and more particularly toward a dolphin for effectively dissipating the energy of large lateral loads.

BACKGROUND OF THE INVENTION

Mooring or breasting structures are known in the maritime arts for guiding and securing vessels to a fixed location on a body of water for loading, unloading or storage. One particular type of mooring or breasting structure, known as a dolphin, consists of groups of elongate piles having a first end driven into the bed underlying the body of water and a second end extending above the body of water for contacting the vessel.

Ideally, in order to avoid damage to either the vessel or the dolphin upon a vessel impacting the dolphin, the dolphin must possess considerable powers of resistance and also a high degree of elasticity. Oberschulte, U.S. Pat. No. 1,837,998, is illustrative of one dolphin structure which attempts to provide the combination of resistance and a high degree of elasticity. Oberschulte teaches providing a plurality of vertical hollow metal piles which are interconnected at their lower ends along a length to be imbedded into the bed underlying a body of water. The remaining portion of the piles, which extend above the bed, are unconnected along their remaining length to provide a resilient structure above the bed for elastically opposing horizontal loads. Not only does such a structure help dissipate the energy of a vessel striking fenders surrounding the piles, but by having the piles unconnected "pull out forces" which might otherwise lead to pulling of the piles from the bed are avoided. However, the structure taught in Oberschulte fails to optimize energy dissipation.

The prior art has recognized that fender piles can be utilized as part of a mooring structure in order to help dissipate the force of an impact of a vessel. Illustrative fender structures are those shown in Peterson, U.S. Pat. No. 2,420,677;

Bergfelder, U.S. Pat. No. 4,919,572; and Julian et al, U.S. Statutory Invention Registration H402.

Peterson teaches a fender pile having a distal end rigidly embedded in a sea bed and a proximal end in abutment with a support structure such as a pier supported on a number of piles. Peterson further teaches providing shock absorbing springs at a select point along the length of the pile for allowing the pile to bend as a horizontal load is applied while preventing the pile from bending beyond its elastic limit.

Bergfelder teaches a prestressed concrete fender pile having a proximal end rigidly secured in a sea bed with a distal end abutting a pier or the like. The concrete fender pile is prestressed with high strength fiber prestressing elements which are resistant to the corrosive effects of water. Bergfelder teaches the fender pile as being able to dissipate energy by the pile bending in response to a horizontal load between the distal end and a point above the proximal end of the pile at around the level of the bed.

Julian teaches an energy absorbing prestressed concrete fender pile which includes a rubber fender or insert between the fender pile and the pier, but which otherwise dissipates energy by deflecting in the same manner as described above with regard to Bergfelder.

While each of these fender systems is somewhat effective in helping to dissipate energy which might ultimately have to be born by the pilings of a dolphin, they can result in high bending moments near the proximal end of the fender pile, which can lead to failure of the fender pile. None of these structures therefore present an optimal solution for dissipating horizontal loads.

Holly, Jr., U.S. Pat. No. 3,852,968, teaches providing cantilevered torque arms with bumpers at their distal ends attached to vertical steel piles. Impacts on the bumpers create torsion and bending forces in the piles to help dissipate energy of an impact. However, Holly requires that the vertical piles be secured against axial rotation at their base, which can be difficult and expensive to achieve. Thus, while making effective use of torsion to absorb a load, the structure taught in Holly is prohibitively expensive in many applications.

One additional known way to assist in the dissipation of energy and to protect a vessel and a fender from wearing from contact therebetween is to provide a bumper on the load impacting fender. Walker, U.S. Pat. No. 3,541,800; Leblanc, U.S. Pat. No. 4,411,556; Thomerson, U.S. Pat. No. 4,338,046; Sluys, U.S. Pat. No. 4,357,891; and Aks, U.S. Pat. No. 3,486,342, teach a number of bumper structures for use on a fender.

While each of the structures discussed above provides some teaching of energy dissipation for fender or dolphin structures, none of them teach an inexpensive, simple to construct dolphin structure which optimizes energy dissipation through the use of each element of the dolphin structure.

The present invention is directed toward overcoming one or more of the problems discussed above.

SUMMARY OF THE INVENTION

A first aspect of the present invention is an energy dissipating dolphin including a plurality of elongate piles in a body of water extending substantially vertically from a bed underlying the body of water. Each pile has a proximal end driven sufficiently deep into the bed to be substantially fixed against horizontal movement and pivoting at the proximal end about a lengthwise axis upon application of a horizontal load. A plate has a hole corresponding to each distal end of a pile, the hole having a diameter sufficient to axially receive a corresponding distal end of a pile while allowing for rotation and translation of the distal end of the pile relative to the plate. A connector connects the plate and the piles. The connector permits translation and rotation of the distal ends of the piles relative to the plate upon application of a horizontal load less than a select amount and prevents translation and rotation of the distal ends of the piles relative to the plate upon application of a horizontal load greater than or equal to the select amount. The connector is preferably a steel bonnet cap fastened to the plate over each hole, each steel bonnet cap having an inner diameter slightly greater than an outer diameter of a corresponding pile.

A second aspect of the present invention is a dolphin for dissipating horizontal loads applied to the dolphin. The dolphin includes a plurality of elongate piles in a body of water extending substantially vertically from a bed underlying the body of water. Each pile has a proximal end driven sufficiently deep into the bed to be substantially fixed against horizontal movement and pivoting at the proximal end about a lengthwise axis upon application of a horizontal load. A cap joins the distal end of the ends of the piles and the cap is configured to receive each distal end of the piles while allowing rotation and translation of the distal ends of the piles relative to the cap, the piles being otherwise unattached one to another along their length. The cap may be a rigid steel plate with holes corresponding to each pile for receiving the distal ends of the piles and further including structure for maintaining the cap at a select position lengthwise of the piles proximate their distal ends. The dolphin preferably further includes an elongate steel pipe fender located relative to the elongate piles to directly contact a horizontal load from a select direction applied to the dolphin. The pipe fender extends substantially vertically from the bed and is pivotally attached about its lengthwise axis at a proximal end to the bed and linked to the steel plate at a distal end, with the link at the distal end leaving the pipe fender free pivot about the lengthwise axis. Preferably, the pipe fender is pivotally attached to the bed by embedding it in the bed a vertical distance sufficient to substantially prevent horizontal movement of the proximal end upon application of a load from the select direction while enabling the pipe fender to pivot about its lengthwise axis at a proximal end.

The energy dissipating dolphin of the present invention provides a structure rigid enough to sustain heavy horizontal loads delivered by a vessel while being flexible enough to dissipate substantial amounts of energy to lessen the risk of harm to both the vessel and the dolphin. The dolphin is sufficiently flexible that the risk of passengers or cargo on a vessel striking the energy dissipating dolphin being toppled is minimized. The energy dissipating dolphin is readily assembled from readily available components, making the cost of the materials and installation competitive with other dolphin structures while providing the many advantages as discussed above.

BRIEF DESCRIPTION OF THE DRAWINGS

FIG. 4 is a cut away view of the pile 12 and plate 28 under a normal operating mode;

FIG. 5 is an elevational cut away view of the pile and plate of FIG. 4 in a failure mode;

FIG. 6 is a cross sectional cut away view of an alternate embodiment of a connection between the plate 28 and a vertical pile 12;

FIG. 7 is a sectional cut away view of the connection of FIG. 6 with the pile 12 depicted in a failure mode.

DETAILED DESCRIPTION OF THE PREFERRED EMBODIMENT

Figure 1:
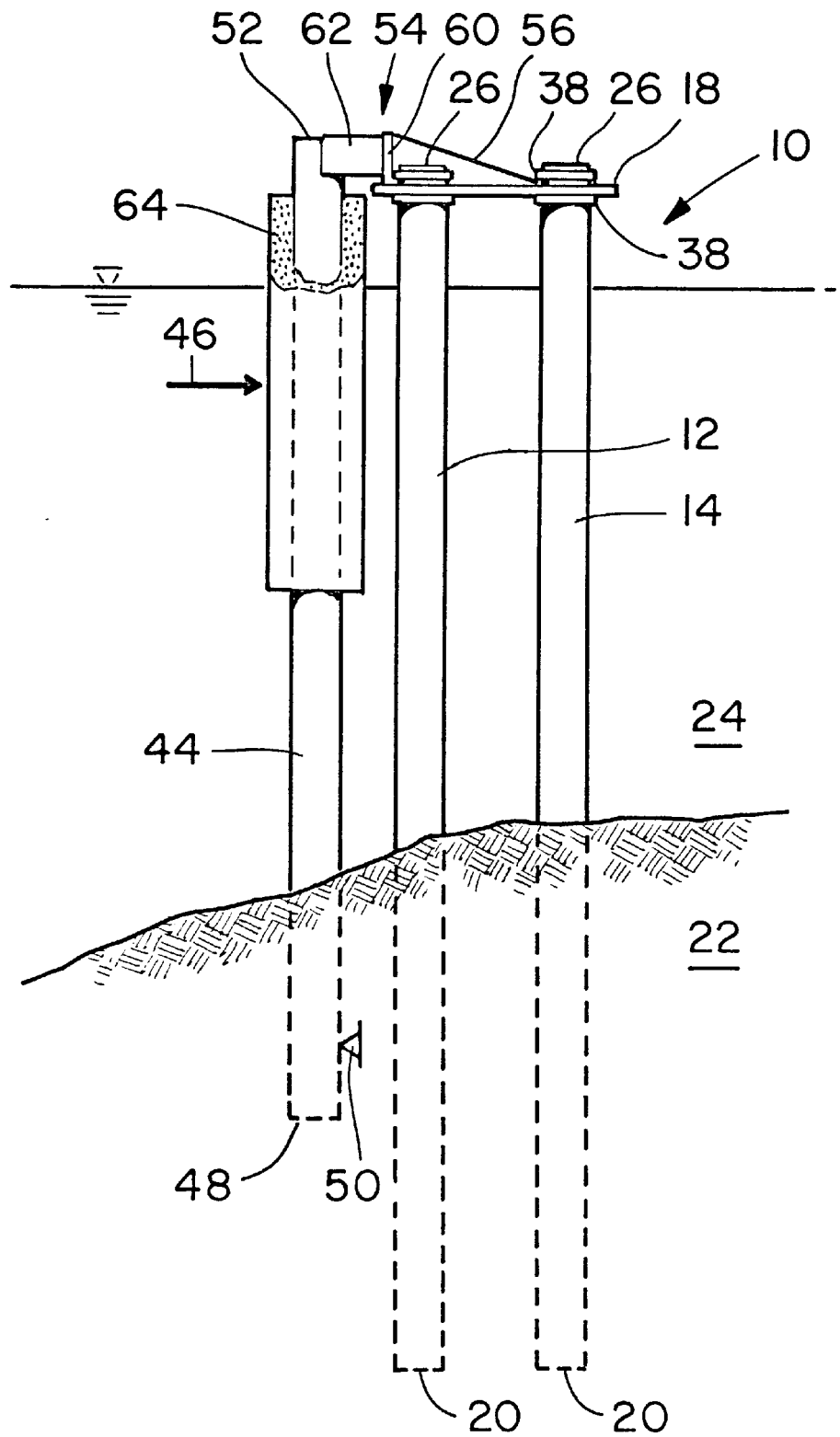
FIG. 1 is a side elevational view of the energy dissipating dolphin of the present invention.
Figure 2:
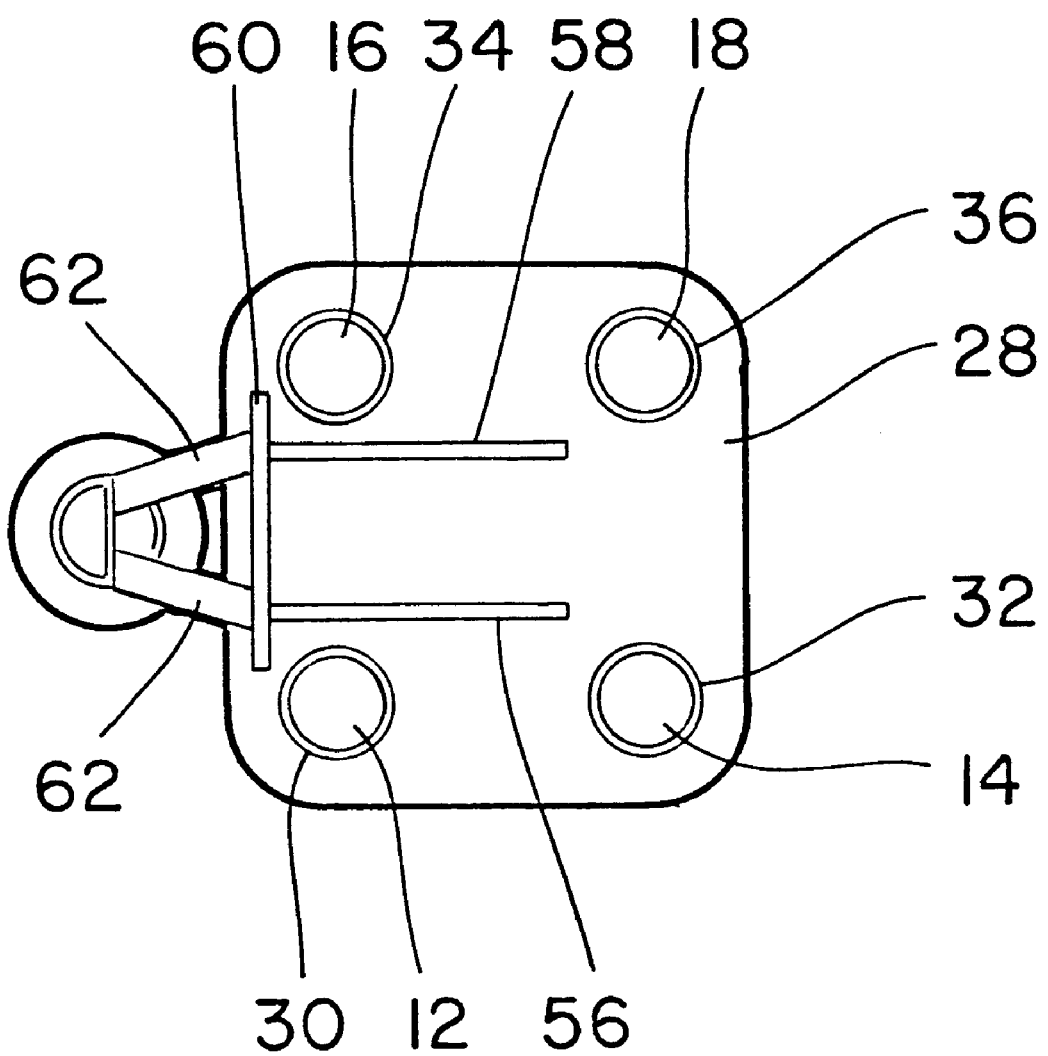
FIG. 2 is a plan view of the dolphin FIG. 1.
Figure 3:
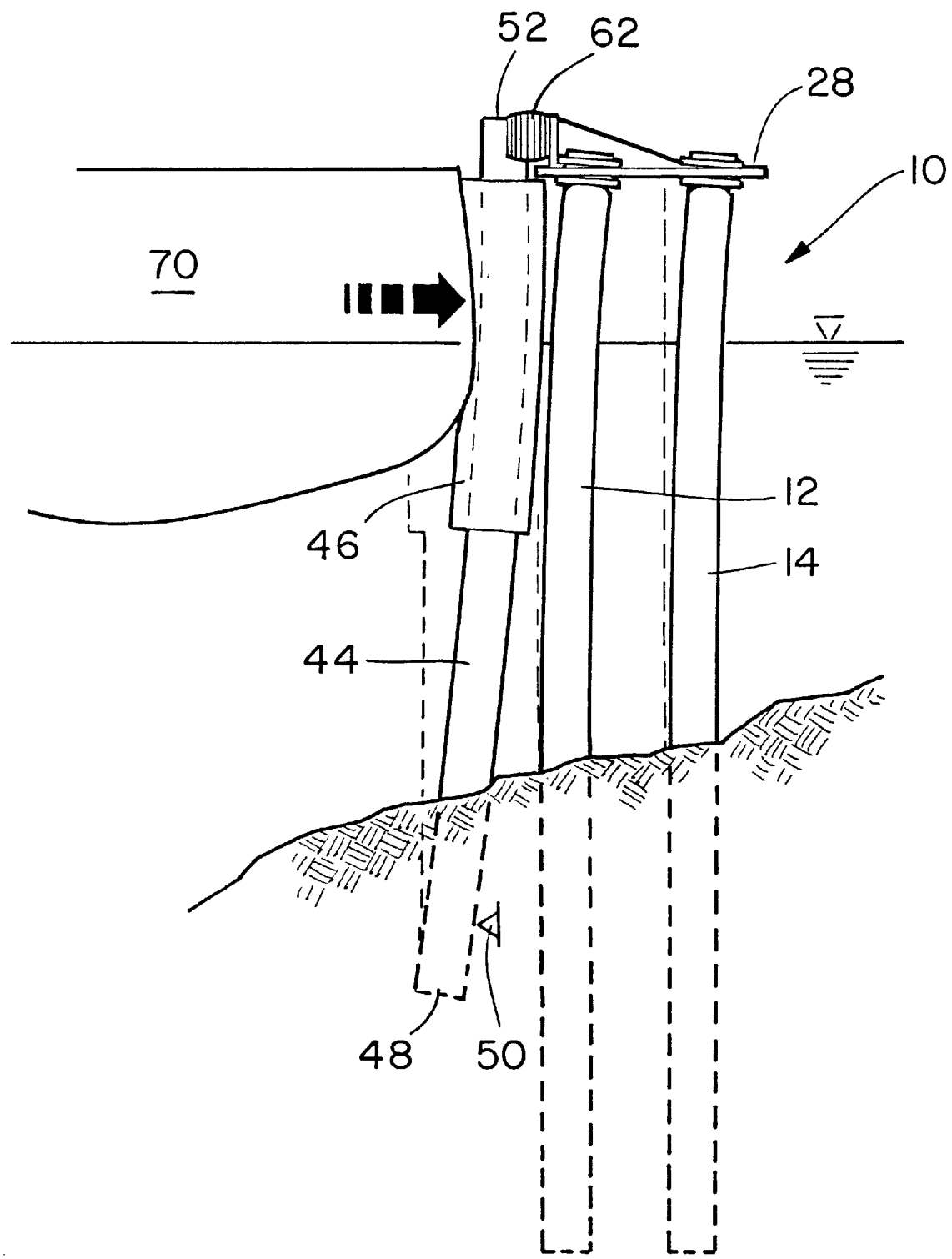
FIG. 3 is an elevational view of the dolphin of FIG. 1 being subjected to a horizontal load by a vessel.

The energy dissipating dolphin 10 as seen in FIG. 1 includes at least four vertical piles 12, 14, 16 and 18, with only piles 12 and 14 visible in FIG. 1. The dolphin could include a larger number of vertical piles, with the number of vertical piles being a matter of design choice dependent upon the size of the loads to be encountered and the length, diameter and wall thickness of the vertical piles used and soil conditions. In the preferred embodiment, the vertical piles are made of tubular steel. The proximal ends 20 of the vertical piles are driven sufficiently deep into a bed 22 underlying a body of water 24 to be fixed against horizontal movement or pivoting about a lengthwise access of the piles upon application of anticipated horizontal loads. Ideally, to minimize the risk of the piles acting as a single pile (i.e., "group action"), the piles are spaced a distance of at least three times the pile diameter. In this respect, FIGS. 1–3 are clearly not drawn to scale.

The piles 12, 14, 16, 18 are substantially unattached along their lengths except proximate their distal ends 26. At the their distal ends 26, a cap made of a rigid steel plate 28 joins the distal ends of the piles. The plate 28 has a hole 30, 32, 34, and 36 corresponding to each vertical pile 12, 14, 16, 18 and each pile is received in the one of the holes. The holes have a diameter greater than the outer diameter of piles and the rigid steel plate 28 is not fixedly attached to any of the vertical piles to allow for relative rotation and translation between the vertical piles and the plate 28. A number of structures can be used for maintaining the steel plate in the select location along the length of the vertical piles while enabling the vertical piles be translated and rotated relative to the plate 28.

FIG. 1 illustrates the connection between the plate 28 and vertical piles being achieved by a lower annular stop 37 and an upper annular stop 38 above and below the steel plates proximate to the distal end of the vertical piles 12, 14, 16 and 18. Preferably, the relative dimensions thickness T of the steel plate 28 and the distance d between the annular stops 37, 38 is such that as the vertical piles are subjected to normal loads they each continue to translate and rotate independently. However, as the piles are deflected to the point that failure is imnminent, the piles are deflected sufficiently that the plate 28 becomes canted between the lower annular stop 37 and the upper annular stop 38, as illustrated in FIG. 5. At this point the vertical piles 12, 14, 16, 18 are fixedly attached at their distal ends 26 against relative rotation and translation so that in the failure mode they act as a single unit. This makes the dolphin as a whole stiffer in the failure mode and enhances the likelihood of the dolphin avoiding catastrophic failure. FIGS. 6 and 7 illustrate a highly preferred embodiment of a structure for connecting the plate 28 and a vertical pile 12. In this embodiment a bonnet cap 39 is attached to the plate 28 by welding, bolting or the like. The plate 28 is then held in place on top of the vertical piles 12, 14, 16, 18 primarily by gravity. However, some other fixing means such as a chain 40 may be provided to minimize the risk of separation. Again, the dimensions of the bonnet cap 39, the hole 30 and the diameter of the piles is such that under normal operating conditions the piles are free to translate and rotate relative to one another and relative to the plate 28. However, as illustrated in FIG. 7, as the piles are deflected sufficiently to approach the failure mode, the distal end 26 becomes canted between the interior of the bonnet 39 and the plate so as to fix the pile relative to the plate 28.

A fender pipe 44 is disposed relative to the vertical piles 12, 14, 16, 18 so as to directly contact a horizontal load from a select direction, as illustrated by the arrow 46. The fender pipe 44, which is preferably an elongate steel tube, has its proximal end 48 embedded in the bed 22. The proximal end 48 is embedded sufficiently deep to substantially prevent horizontal movement of the pipe fender 44 upon application of a load from the select direction 46 yet to allow the fender pipe 44 to translate (e.g., move in an arch) at the distal end 52 about the lengthwise axis of the fender pipe 44. Thus, in essence, the fender pipe functions as being pinned to the bed at 50.

The fender pipe extends substantially vertically from the bed at 22 through the body of water 24 and has its distal end 52 joined by a link 54 to the steel plate 28. The link 54 consists of a pair of triangular supports 56, 58 which abut a steel bracket 60. The steel bracket 60 is welded to the top surface of the steel plate 28 and to the ends of the fender supports 56, 58 so as to ensure a rigid connection. An elastomeric insert or fender 62 lies between the distal end 52 of the fender pipe 44 in the steel bracket 60. The elastomeric insert 62 could be made of natural or artificial rubber as well as known substitutes such as coil springs. The above described link 54 allows the fender pipe 44 to pivot about the lengthwise access of the fender pipe 44 at the distal end 52.

Proximate the distal end 52 of the fender pipe 44 an annular bumper ring or collar 64 is provided. The annular bumper collar could take any number of forms, such as those illustrated in Leblanc, U.S. Pat. No. 4,411,556; Thomerson, U.S. Pat. No. 4,338,046, or any other known annular bumper structure. The annular bumper collar is installed on the pipe fender 44 to enable it to rotate around the lengthwise axis of the fender pipe 44.

It is important to note that while the fender pipe 44 is illustrated as being substantially vertical in FIG. 1, it could also be configured to incline from the vertical toward the piles 12, 14, 16 and 18 and still function to provide the advantages described herein.

FIG. 3 illustrates the energy dissipating dolphin 10 when subjected to a horizontal load in the direction of the arrow 46 of FIG. 1 by a vessel 70. When the vessel 70 strikes the energy absorbing dolphin 10, the collar 64 is compacted, dissipating some of the energy. The fender pipe 44 bends between the distal end 52 and the proximal end 48. Because of the pivotal connections at the distal ends 52 and the proximal end 48, the bending moment is distributed along substantially the entire length of the fender pipe 44. Additional energy is absorbed by compaction of the elastomeric inserts 62. Finally, the vertical piles 12, 14, 16 and 18, are free to deflect as illustrated in FIG. 3, thereby dissipating additional energy resulting from the load.

The energy dissipating dolphin provides an extremely efficient fendering system which is readily assembled from conventional materials, resulting in great cost savings at installation. The dolphin provides four distinct but complimentary energy dissipating components: The pipe fender which pivots about both ends, the pipe fender bearing, the elastomeric insert between the pipe fender and the backing piles and the backing piles which are flexible along their length. The dolphin has a berthing energy to berthing reaction ratio of greater than 2:1. Moreover, the dolphin structure provides a smooth failure mode that minimlizes damage potential to a vessel should the dolphin be over stressed and collapse under a horizontal load. In addition, the dolphin is extremely flexible, enabling it to deflect elastically several feet. This is a significant advantage in applications such as a breasting dolphin for ferry vessels because it minimizes the chances of passengers or cargo being toppled upon impact, a serious concern with more rigid structures.

EXAMPLE

Figure 8:
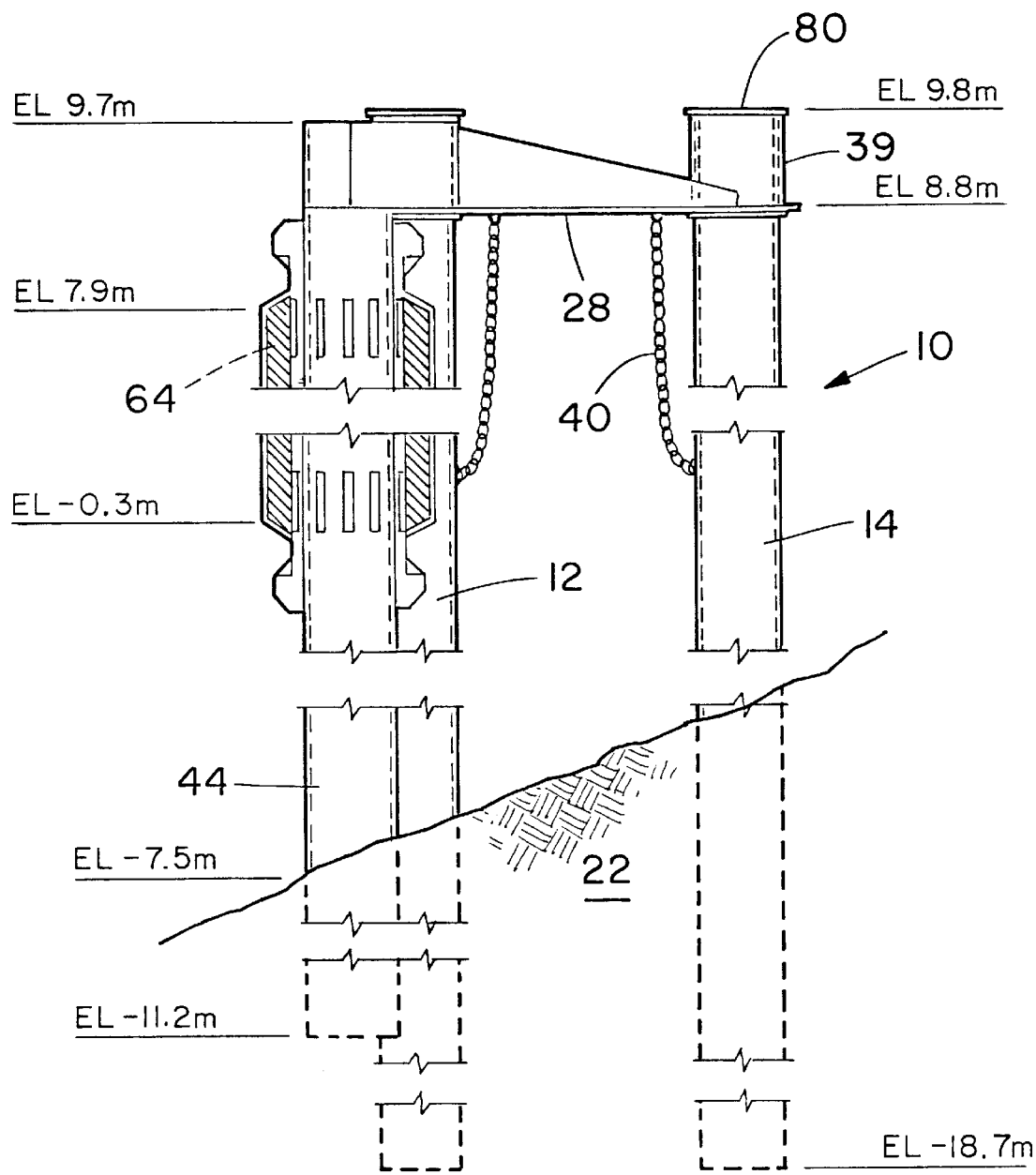
FIG. 8 is an elevational view of an example installation of a preferred embodiment of the dolphin.

FIG. 8 is an elevational view of an actual installation of the energy dissipating dolphin 10 in accordance with the present invention. This example serves to illustrate the relative dimensions of a dolphin providing the described advantages.

In this embodiment the fender pile is made of steel pipe having an outer diameter of 36 inches and a wall thickness of one inch. Appearing in FIG. 8 are the elevations relative to mean sea level of the fender pile 44 and the piles 12, 14, 16, 18. From these elevations it can be seen that the fender pile is buried approximately 3.6 meters (11.8 feet) into the sea bed 22. The fender pile extends about 17.3 meters (56.7 feet) from the sea bed to its distal end 52. Each of the piles 12, 14, 16 and 18 are made of steel pipe having an outer diameter of 30 inches and a one inch wall thickness. As illustrated in FIG. 8, these piles are driven about 7.5 meters (24.6 feet) deeper into the bed 22 than the fender pile 44. In this embodiment, bonnet caps 39 is used to secure the plate 28 to the piles 12, 14, 16 and 18. The bonnet caps 39 are welded to the top of the plate 28. Each bonnet cap is made of 36 inch outer diameter pipe with a one inch wall thickness. This leaves about a four inch difference between the inner diameter of the bonnet cap 39 and the outer diameter of the piles 12, 14, 16, 18. Each bonnet cap is about one meter (3.3 feet) high and has a top plate 80 made of one inch thick plate. The chain 40, preferably made of 0.75 inch high tensile steel, extends between the piles 12, 14 and the plate 28 to ensure that the plate 28 will not become separated from the piles 12, 14, 16, 18. This particular embodiment is designed to deflect at the distal ends up to five feet during normal operation.

What is claimed is:

1. A dolphin for dissipating a horizontal load applied to the dolphin, the dolphin comprising:
   a plurality of elongate piles in a body of water extending substantially vertically from a bed underlying the body of water, each pile having a proximal end driven sufficiently deep into the bed to be substantially fixed against horizontal movement and pivoting at the proximal end about a lengthwise axis upon application of a horizontal load; and
   a rigid cap joining the distal ends of the piles, the cap being configured to receive each distal end of the piles while allowing rotation and translation of the distal ends of the piles relative to the cap, the piles being otherwise unattached one to another along their length.

2. The dolphin of claim 1 wherein the cap comprises a rigid steel plate with a hole corresponding to each pile for receiving the distal end of the pile, the cap further comprising means for maintaining the cap at a select position lengthwise of the piles proximate their distal ends.

3. The dolphin of claim 2 wherein the elongate piles are make of steel tubing.

4. The dolphin of claim 3 further comprising an elongate steel pipe fender located relative to the elongate piles to directly contact a horizontal load from a select direction applied to the dolphin, the pipe fender extending substantially vertically from the bed, the pipe fender being pivotally attached about its lengthwise axis proximate a proximal end to the bed and linked to the steel plate proximate a distal end, the link at the distal end leaving the pipe fender free to pivot about the lengthwise axis.

5. The dolphin of claim 4 further comprising an energy dissipating insert disposed between the steel plate and the distal end of the fender pile.

6. The dolphin of claim 5 wherein the energy dissipating insert is made of an elastomer.

7. The dolphin of claim 5 further comprising:
   an energy dissipating bearing attached to the pipe fender proximate the distal end of the pipe fender positioned to directly contact a load from the select direction.

8. The dolphin of claim 6 wherein the energy dissipating bearing is attached to the pipe fender for rotation about the longitudinal axis of the pipe fender.

9. The dolphin of claim 4 wherein the proximal end of the pipe fender is pivotally attached to the bed by embedding it in the bed a vertical distance sufficient to substantially prevent horizontal movement of the proximal end upon application of a load from the select direction while enabling the pipe fender to pivot about the lengthwise axis at the proximal end.

10. A dolphin for dissipating a horizontal load applied to the dolphin, the dolphin comprising:
- a plurality of elongate piles in a body of water extending substantially vertically from a bed underlying the body of water, each pile having a proximal end driven sufficiently deep into the bed to be substantially fixed against horizontal movement and pivoting at the proximal end about a lengthwise axis upon application of a horizontal load;
- a rigid plate having a hole corresponding to each distal end of a pile, the hole having a diameter sufficient to axially receive a corresponding distal end of a pile while allowing for rotation and translation of the distal ends of the piles relative to the plate; and
- connecting means for connecting the plate and piles, the connecting means permitting translation and rotation of the distal ends of the piles relative to the plate upon application of a horizontal load less than a select amount and preventing translation and rotation of the distal ends of the piles relative to the plate upon application of a horizontal load greater than or equal to the select amount.

11. The dolphin of claim 10 wherein the plate is steel and the connecting means comprises a steel bonnet cap fastened to the plate over each hole, each bonnet cap having an inner diameter slightly greater than an outer diameter of a corresponding pile.

12. The dolphin of claim 10 further comprising an elongate pipe fender located relative to the backing structure to directly contact a horizontal load from a select direction, the pipe fender extending substantially vertically from the bed, the pipe fender being pivotally attached near its proximal end to the bed and linked in abutment to the backing structure at a distal end, the link at the distal end leaving the fender free to pivot about the lengthwise axis.

13. The mooring structure of claim 12 wherein the proximal end of the pipe fender is pivotally attached to the bed by embedding it in the bed a vertical distance sufficient to substantially prevent horizontal movement of the proximal end upon application of a load from the select direction while enabling the pipe fender to pivot about the lengthwise axis.

* * * * *